(12) United States Patent
Oki et al.

(10) Patent No.: US 8,368,842 B2
(45) Date of Patent: Feb. 5, 2013

(54) SURFACE LIGHT SOURCE DEVICE AND LCD UNIT

(75) Inventors: Yoji Oki, Tokyo (JP); Atsushi Kurita, Tokyo (JP)

(73) Assignee: Stanley Electric Co., Ltd., Tokyo (JP)

( * ) Notice: Subject to any disclaimer, the term of this patent is extended or adjusted under 35 U.S.C. 154(b) by 732 days.

(21) Appl. No.: 12/610,345

(22) Filed: Nov. 1, 2009

(65) Prior Publication Data

US 2010/0110334 A1    May 6, 2010

(30) Foreign Application Priority Data

Oct. 31, 2008   (JP) ................................. 2008-280789

(51) Int. Cl.
*G02F 1/13357* (2006.01)
*F21V 8/00* (2006.01)

(52) U.S. Cl. ............................ 349/65; 362/612; 362/623

(58) Field of Classification Search .................... 349/65; 362/605, 606, 612, 621, 623
See application file for complete search history.

(56) References Cited

U.S. PATENT DOCUMENTS

| | | | | |
|---|---|---|---|---|
| 5,788,356 A * | 8/1998 | Watai et al. | | 362/621 |
| 7,654,718 B2 * | 2/2010 | Tye et al. | | 362/603 |
| 7,671,940 B2 * | 3/2010 | Li et al. | | 349/114 |
| 8,047,697 B2 * | 11/2011 | Shigeta et al. | | 362/612 |
| 2006/0013019 A1 * | 1/2006 | Huang et al. | | 362/616 |
| 2010/0007818 A1 * | 1/2010 | Saitoh et al. | | 349/61 |

FOREIGN PATENT DOCUMENTS

| | | |
|---|---|---|
| JP | 06-82628 A | 3/1994 |
| JP | 2002-117715 A | 4/2002 |
| JP | 3688398 B2 | 6/2005 |

* cited by examiner

*Primary Examiner* — Dung Nguyen
*Assistant Examiner* — Tai Duong
(74) *Attorney, Agent, or Firm* — Kenealy Vaidya LLP

(57) ABSTRACT

The disclosed subject matter includes providing a surface light source device with high brightness that can emit light from both surfaces and an LCD unit having the same qualities. The surface light device can include a light guide having a light incoming surface, a reflecting sheet located adjacent the light guide, a transparent sheet having a light incoming surface located adjacent the reflecting sheet and a light source located toward both light incoming surfaces. Light emitted from the light source can be configured to enter into the light guide and the transparent sheet via the light incoming surfaces. The light can be efficiently emitted in both directions from the light guide and the transparent sheet using the reflecting sheet. Therefore, an LCD unit that includes an LCD located adjacent the light guide and a second display located adjacent the transparent sheet can illuminate displays with higher brightness.

20 Claims, 13 Drawing Sheets

Fig. 1a
Fig. 1b
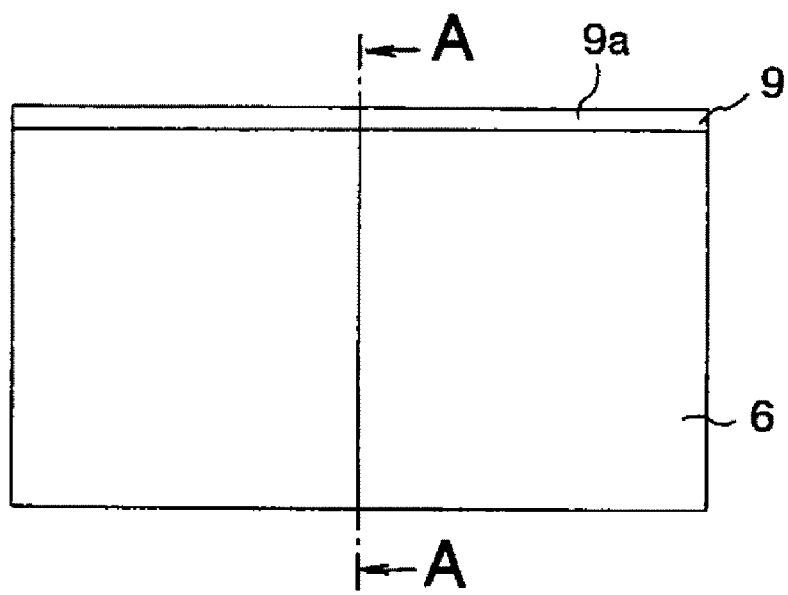
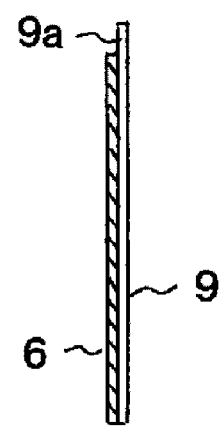

Dot pattern

Dot pattern

SURFACE LIGHT SOURCE DEVICE AND LCD UNIT

This application claims the priority benefit under 35 U.S.C. §119 of Japanese Patent Application No. 2008-280789 filed on Oct. 31, 2008, which is hereby incorporated in its entirety by reference.

BACKGROUND

1. Field

The presently disclosed subject matter relates to a surface light source device and an LCD unit including the same, and more particularly to a surface light source device which can be configured to exhibit high brightness from both surfaces of the surface light source. Thus, the surface light source device can be employed as a light source for a back light unit located adjacent a liquid crystal display (LCD) for a personal computer and the like, in which the surface light source device can also illuminate a display located in an opposite direction of the LCD.

2. Description of the Related Art

Conventional optical transmission displays such as LCDs and the like are typically illuminated from a rear portion thereof by a surface light source device in order to light their displays. In a color LCD unit used for a personal computer or a television, the light transmission rate thereof decreases due to various reasons including restriction of an aperture ratio, use of a color filter, etc. Thus, the LCD unit is illuminated from its back using a back light unit like the surface light source device.

The surface light source device for a back light unit that illuminates from the back of the display unit can be broadly classified as an edge light type and a direct light type (when classified by location of the light source). The surface light source device of the direct light type is composed of a diffusing member and a plurality of light sources, which are located rearward of the diffusing member so as to emit a diffusing light from the plurality of light sources via the diffusing member. Thus, the direct light type device may illuminate an LCD with high brightness, but the LCD unit using the direct light type device may have a large thickness.

On the other hand, the edge light type is composed of a light guide and at least one light source, which is located at least one edge of the light guide so as to emit light from one surface of the light guide. Thus, an LCD unit using an edge light type device is thinner compared to an LCD unit using the direct light type. However such an LCD unit may be darker than that using the direct light type device because the LCD unit is indirectly illuminated via the light guide. Therefore, various edge light type surface light sources with high brightness have been devised.

For example, a surface light source with high brightness is disclosed in Patent Document No. 1 (Japanese Patent Application Laid Open H06-082628). FIG. 13 is a cross-section view depicting a basic structure for a conventional surface light source device, which is disclosed in Patent Document No. 1. The conventional surface light source device 51 includes: a light guide 53 having a first surface and a second surface; a diffusing sheet 55 located adjacent the first surface of the light guide 53; a reflecting sheet 56 located adjacent the second surface of the light guide 53; a plurality of discharge lamps 54 located adjacent a surface between the first and second surfaces of the light guide 53; and a reflector 54a located so as to cover the discharge lamps 54 therewith.

In the surface light source device 51, light emitted from the discharge lamps 54 enters into the light guide 53 and is diffused in the light guide 53 while reflecting on the reflecting sheet 56, and finally is emitted from the first surface of the light guide 53 through the diffusing sheet 55. In this case, the plurality of discharge lamps 54 is located adjacent the surface between the first and the second surfaces of the light guide 53, which includes a plurality of dot patterns on the second surface in order to provide a uniform light-emission. Therefore, the surface light source device 51 can improve the brightness while maintaining similar in thickness and in uniform-emission to an existing surface light source device.

A reflector for a surface light source device is disclosed in Patent Document No. 2 (Japanese Patent Application Laid Open JP2002-117715). According to Patent Document No. 2, light emitted from a lamp (corresponding to mark 54 in FIG. 13) can be reflected into a light guide (corresponding to mark 53 in FIG. 13) with a reflector (corresponding to mark 54a in FIG. 13) that is made by forming a silicone hard coated layer on a silver layer. Therefore, a surface light source device using the reflector may improve the brightness because the light emitted from the lamp may enter into the light guide with high efficiency.

A surface light source device with high brightness is disclosed in Patent Document No. 3 (Japanese Patent No. 3,688,398). According to Patent Document No. 3, a reflecting sheet (corresponding to mark 56 in FIG. 13) is composed of a light-diffusing reflective surface on an area located close to a light source (corresponding to mark 54 in FIG. 13) and a complete reflective surface on the other area. Therefore, the surface light source device using the reflecting sheet may improve the brightness because a light that is reached on the reflecting sheet can be reflected into the light guide with high efficiency.

Meanwhile, LEDs have been used as a light source for surface light source devices due to commercialization of high brightness LEDs. FIG. 11 is a partial cross-section view depicting a relevant part of a conventional surface light source device in which LEDs are used as a light source. The basic structure of the surface light source device 101 is similar to that of the surface light source device shown in FIG. 13, because the structure basically only replaces the discharge lamps in FIG. 13 with an LED light source.

The surface light source device 101 includes: a light guide 103 having a first surface and a second surface and a third surface 103a; a diffusing sheet 105 located on the first surface of the light guide 105; a reflecting sheet 106 located on the second surface of the light guide 103; the LED light source 104 located adjacent the third surface 103a of the light guide 103; and a casing 102 covering the LED light source 104 and the reflecting sheet 106 therewith.

The light guide 103 is composed of a flat transparent material such as an acrylic resin and the like. The first surface and the second surface are substantially parallel with respect to each other. The third surface 103a is an end surface between the first and second surfaces, and is substantially perpendicular to the first and the second surfaces. The diffusing sheet 105 is located on the first surface of the light guide 105, and the reflecting sheet 106 is located on the second surface of the light guide 105 as shown in FIG. 11.

The LED light source 104 is located adjacent the third surface 103a of the light guide 103, and the third surface 103a can operate as an incoming surface for light emitted from the LED light source 104 into the light guide 103. The LED light source 104 is composed of a plurality of LEDs, which are mounted on a flexible printed circuit board 107 via solders so as to align along the third surface 103a of the light guide 103.

The flexible printed circuit board 107 that mounts the LED light source 104 thereon is attached to the casing 102 via a white adhesive tape 108.

A part of the reflecting sheet 106 is attached to the adhesive tape 108, and a part of the light guide 103 that mounts the reflecting sheet 106 on the second surface thereof is attached to the adhesive tape 108. Consequently, the LED light source 104, the printed circuit board 107, the light guide 103 and the reflecting sheet 106 can be fixed in the casing 102.

A white reflecting sheet, a metallic reflecting sheet and the like is used as the reflecting sheet 106. The white reflecting sheet is made by kneading an inorganic white pigment such as barium carbonate, barium sulfate and the like into white polyester, a white polycarbonate, etc. The white reflecting sheet can improve a white color by generating bubbles therein in the manufacturing process.

The white reflecting sheet cannot completely reflect light, but a part of light may leak through the white reflecting sheet. However, the leak light may be effectively utilized. FIG. 12 is a perspective view depicting an exemplary illumination of a personal computer cover using the conventional surface light source device shown in FIG. 11. A logo M of a personal computer cover 12 may be illumined by the leak light that leaks from the white reflecting sheet, and the commodity value may be improved by the utility of the leak light.

The above-referenced Patent Documents are listed below and are hereby incorporated with their English abstract in their entireties.

1. Patent Document No. 1: Japanese Patent Application Laid Open H06-082628
2. Patent Document No. 2: Japanese Patent Application Laid Open JP2002-117715
3. Patent Document No. 3: Japanese Patent No. 3,688,398

As described above, illumination for the logo may be carried out by a characteristic of the white reflecting sheet in which light may leak. The rear illumination is not necessarily controlled under an optimal condition. Therefore, the surface light source device may have the characteristic or problem of not emitting light with high light use efficiency and a high brightness. Even if the LED light source 104 is provided with the reflector that is disclosed in Patent Document No. 2, the light use efficiency for the surface light source device may not change, instead, the manufacturing process may become complex.

When the reflecting plate disclosed in Patent Document No. 3 is employed as the reflecting sheet, the reflecting plate is basically composed of a complete reflective surface in order to improve the brightness. Thus, an amount of light emitted from the first surface of the light guide 105 may increase, but the logo that is located adjacent the reflecting sheet may not be illuminated because light may not leak through the reflecting sheet.

The disclosed subject matter has been devised to consider the above and other problems and characteristics. Thus, embodiments of the disclosed subject matter can include a surface light source device that can efficiently emit light from the multiple surfaces thereof with high brightness and uniform brightness. In addition, the surface light source device can be maintained thin even when increasing the brightness thereof and when the emitting area thereof becomes large. The disclosed subject matter can also include an LCD unit using the surface light source device as described above. The LCD unit can be configured to increase the brightness of the display, and a second optical transmission displays that is located on an opposite side of the LCD can also be illuminated adequately for any purpose.

SUMMARY

The presently disclosed subject matter has been devised in view of the above described and other problems and characteristics in the conventional art, and to make certain changes to the existing structures of conventional surface light sources. An aspect of the disclosed subject matter includes providing a surface light source device capable of emitting light with high brightness and uniform brightness from both surfaces. Furthermore, according to the disclosed embodiments, the surface light source device can maintain a thin profile even when increasing the brightness thereof. Thus, the surface light source device of the disclosed subject matter can be employed as a light source for a back light unit located at the rear of an LCD panel of a personal computer, computer monitor, and the like.

Another aspect of the disclosed subject matter includes providing a LCD unit using the above-described surface light source device that can exhibit front and rear displays with high brightness and high uniformity. In addition, because the LCD unit can be formed with a substantially thin profile, it can be employed as a display unit for a personal computer, etc.

According to an aspect of the disclosed subject matter, a surface light source device can include a light guide having a first surface and a second surface and at least one light incoming surface, the light guide can include and be formed from a transparent resin, the at least one light incoming surface thereof being substantially perpendicular to both the first surface and the second surface, a light source located adjacent the at least one light incoming surface of the light guide, a reflecting sheet having a first surface and a second surface and an end, the first surface of the reflecting sheet located adjacent the second surface of the light guide; and a transparent sheet having a first surface and a second surface and a light incoming surface, the transparent sheet formed from a transparent resin, the first surface of the transparent sheet including the light incoming surface on the first surface and located adjacent the second surface of the reflecting sheet, the light incoming surface having an end surface located close to and/or adjacent the end of the reflecting sheet, the light incoming surface facing the second surface of the light guide so as not to be interrupted by the reflecting sheet, and the end surface of the light incoming surface located toward the light source.

According to the above-described exemplary embodiment, light emitted from the light source can enter into the light guide via the light incoming surface of the light guide, and the light can be emitted from the first surface of the light guide after being diffused in the light guide using the reflecting sheet. In addition, the light can also enter into the transparent sheet via the light incoming surface of the transparent sheet, and the light can be emitted from the second surface of the transparent sheet after being diffused in the transparent sheet using the reflecting sheet. Thus, the surface light source device can emit light from both the first surface of the light guide and the second surface of the transparent sheet.

In the exemplary surface light source device, a transparent smooth tape can be further located between the second surface of the light guide and the light incoming surface of the transparent sheet, and the end surface of the transparent surface can contact the light source. In these cases, because the light that enters into the transparent sheet via the light incoming surface of the transparent sheet can increase, the surface light source device can provide improved light use efficiency.

In the above-described exemplary embodiment, a plurality of LEDs can be mounted on a circuit board as the light source and can be located adjacent the at least one light incoming surface of the light guide so as to align along the at least one third surface. In addition, a casing can be located adjacent the plurality of LEDs and the circuit board, the casing covering the light incoming surface of the light guide and at least part of the second surface of the transparent sheet that is positioned opposite the light incoming surface on the first surface of the transparent sheet, and a white adhesive tape can be located between the casing and at least the part of the second surface of the transparent sheet that is positioned opposite the light incoming surface on the first surface of the transparent sheet, wherein the circuit board, the light guide, the reflecting sheet and the transparent sheet are attached to the casing with the white adhesive tape.

According to the above-described exemplary embodiment, the surface light source device can emit a light with high brightness, because the light emitted from the light source may not leak from parts other than the light incoming surfaces of both the light guide and the transparent sheet. Moreover, the thickness of surface light source device can become thin with a simple structure.

In the above-described exemplary surface light source device, the reflecting sheet can include a silver layer on at least the first surface thereof, and a light-emitting treatment can be formed on the first surface and/or the second surface of the transparent sheet. In these cases, because a reflectivity of the reflecting sheet can improve and the light-emitting efficiency of the transparent sheet can improve, the lights emitted from both the light guide and the transparent sheet can result in a high brightness and uniform brightness.

Another aspect of the disclosed subject matter includes a liquid crystal display unit including the above-described surface light source device that can include at least one optical sheet having a first surface and a second surface, the second surface thereof located adjacent the first surface of the light guide, a liquid crystal display located on the first surface of the at least one optical sheet, and a second optical transmission display located adjacent the second surface of the transparent sheet.

According to the above-described exemplary liquid crystal display unit, the above-described surface light source device can illuminate the LCD with high brightness and uniform brightness, and also can illuminate the second optical transmission display under the optimal condition according to the usage and the like of the LCD unit. Thus, the disclosed subject matter can provide a surface light source device with a high brightness that can emit lights from both sides and a LCD unit having the same qualities.

BRIEF DESCRIPTION OF THE DRAWINGS

These and other characteristics, features and advantages of the disclosed subject matter will become clear from the following description with reference to the accompanying drawings, wherein:

FIG. 1a is a schematic front view showing a first exemplary positional relationship between a reflecting sheet and a transparent sheet for the disclosed subject matter, and FIG. 1b is a cross-sectional view of the subject matter of FIG. 1a along line A-A;

DETAILED DESCRIPTION OF EXEMPLARY EMBODIMENTS

Figure 2A:
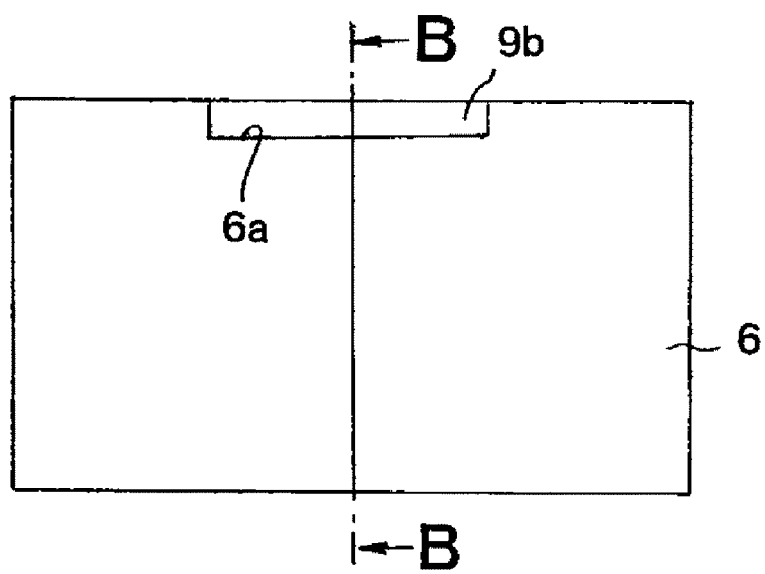
FIG. 2a is a schematic front view showing a second exemplary positional relationship between a reflecting sheet and a transparent sheet for the disclosed subject matter.

Exemplary embodiments of the disclosed subject matter will now be described in detail with reference to FIG. 1 to FIG. 10. One distinction between the conventional surface light source device shown in FIG. 11 and a surface light source device of the disclosed subject matter is the inclusion of a transparent sheet in the surface light source device of the disclosed subject matter. The transparent sheet can include a first surface and a second surface and can be located adjacent a reflecting sheet having a first surface and a second surface. The first surface of the reflecting sheet can be located on a light guide, and the second surface of the reflecting sheet can be located on the first surface of the transparent sheet.

FIG. 1a is a schematic front view showing a first exemplary positional relation between a reflecting sheet 6 and a transparent sheet 9 in the surface light source device of the disclosed subject matter, and FIG. 1b is a cross-section view of FIG. 1a along a line A-A. The reflecting sheet 6 and the transparent sheet 9 can be formed in a rectangular shape in view of their first surfaces for a shape of a light guide described later. A first surface of the transparent sheet 9 can substantially face a second surface of the reflecting sheet 6. However, a part of the first surface of the transparent sheet 9 can be exposed so as to eliminate overlap with the second surface of the reflecting sheet 6.

The reflecting sheet 6 can be made as a multilayer by forming a metallic layer having high reflectivity, such as a silver, an aluminum and the like on a polyester film using an evaporation method, a sputtering method, etc. A thin resin (e.g. ESR made by 3M Limited) can also be formed on the polyester film. The reflecting sheet 6 can improve the light use efficiency due to a high reflectivity thereof, and can result in a surface light source device with high brightness.

A transparent resin such as an acrylic resin, a polycarbonate resin, a polyester resin, a polyolefin resin and the like can be used as the transparent sheet 9. In a positional relationship between the transparent sheet 9 and the reflecting sheet 6 shown in FIGS. 1a and 1b, the transparent sheet 9 can project from the reflecting sheet 6 to form a projecting portion. For instance, a width of the projecting portion 9a can be 0.2 to 10 mil meters away from an end of the reflecting sheet 6.

When the transparent sheet 9 is incorporated in the surface light source device, because the projecting portion 9a can be located close to a light source, the projecting portion 9a can operate as an light incoming surface for a rear illumination as described in detail later. An end surface of the projecting portion 9a can also operate as the light incoming surface for rear illumination. The projecting portion 9a which forms a light incoming surface can be described in one embodiment as a window or opening that is exposed to the light guide 3 without interruption by the reflecting sheet 6. In the embodiment shown in FIG. 7, if one were to take an imaginary line that is substantially perpendicular to the bottom or second surface of the light guide 3 and substantially perpendicular to the light incoming surface of the projecting portion 9a, the imaginary line would intersect the light guide 3 and the transparent sheet 9 but would be spaced from (and not intersect, or be interrupted by) the reflecting sheet 6. To further characterize another aspect of this relationship, the transparent sheet 9 extends further towards the light source 4 than does the reflecting sheet 6 in certain embodiments of the disclosed subject matter. In addition, the reflecting sheet 6 can be shaped to provide exposed portion(s) of the transparent sheet 9 such that light can travel between the light guide 3 and the transparent sheet 9 without reflection and/or interruption by the reflecting sheet 6 at the exposed portion(s) of the transparent sheet 9.

Figure 2B:
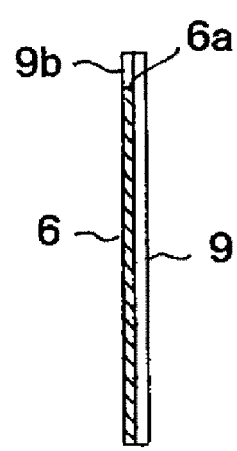
FIG. 2b is a cross-sectional view of the subject matter of FIG. 2a taken along line B-B.

FIG. 2a is a schematic front view showing a second exemplary positional relation between the reflecting sheet 6 and the transparent sheet 9 in the surface light source device of the disclosed subject matter, and FIG. 2b is a cross-sectional view of FIG. 2a along a line B-B. In a positional location between the transparent sheet 9 and the reflecting sheet 6 shown in FIGS. 2a and 2b, the transparent sheet 9 can be exposed in a rectangle shape from the end surface thereof, which can be located toward the light source.

In other words, the reflecting sheet 6 can include a cutout section 6a that is formed as a rectangle in shape from an end of the reflecting sheet 6 thereof, which can be located toward the light source. The projecting portion 9b on the first surface of the transparent sheet 9 that is exposed by the cutout section 6a of the reflecting sheet 6 can operate as the light incoming surface for the rear illumination as described later.

Figure 3A:
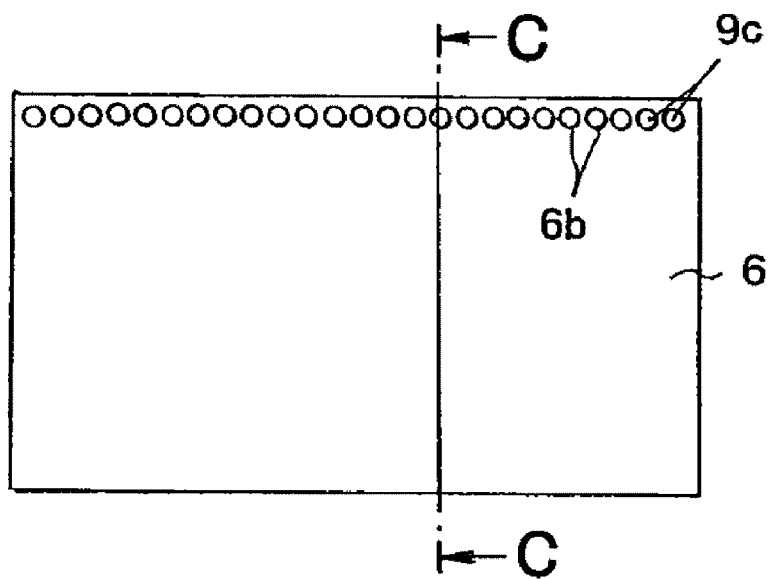
FIG. 3a is a schematic front view showing a third exemplary positional relationship between a reflecting sheet and a transparent sheet for the disclosed subject matter.
Figure 3B:
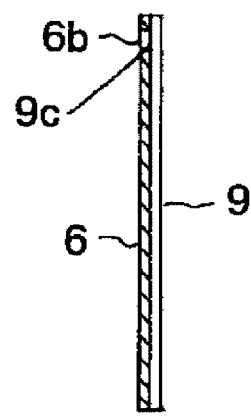
FIG. 3b is a cross-sectional view of the subject matter of FIG. 3a taken along line C-C.

FIG. 3a is a schematic front view showing a third exemplary positional relationship between the reflecting sheet 6 and the transparent sheet 9 in the surface light source device of the disclosed subject matter, and FIG. 3b is a cross-sectional view of FIG. 3a along a line C-C. In a positional relationship between the transparent sheet 9 and the reflecting sheet 6 shown in FIGS. 3a and 3b, the transparent sheet 9 can be exposed by a plurality of openings 9c that are located close to the end surface thereof and can be aligned along the end surface.

That is to say, the reflecting sheet 6 can include a plurality of holes 6b in line along an edge that can be located toward the light source. The openings 9c on the first surface of the transparent sheet 9 that are exposed by the plurality of holes 6b on the reflecting sheet 6 can operate as the light incoming surface for the rear illumination along with the end surface as described later.

Figure 11:
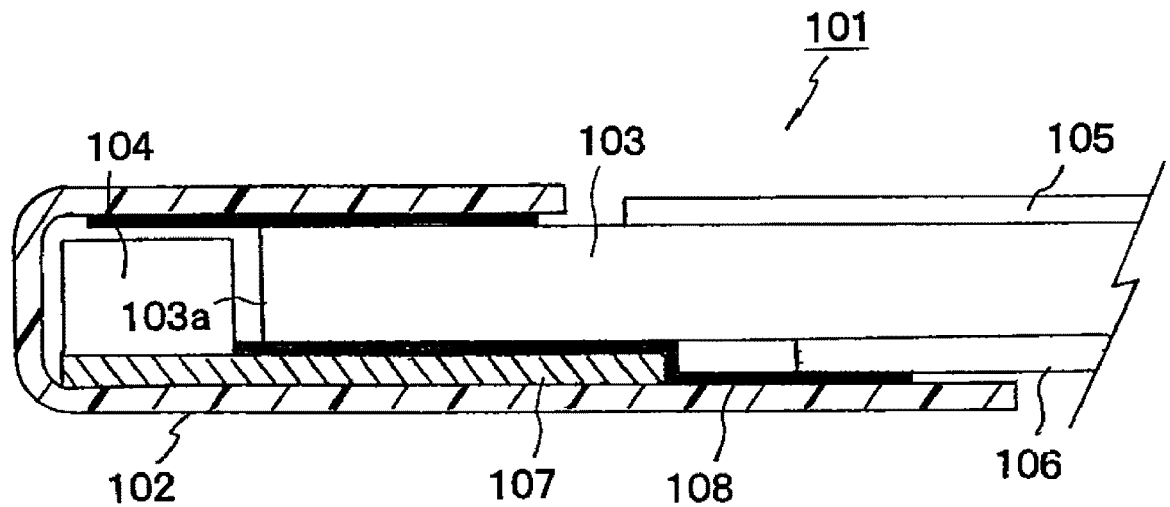
FIG. 11 is a partial cross-sectional view depicting a relevant part of a conventional surface light source device in which LEDs are used as a light source.
Figure 12:
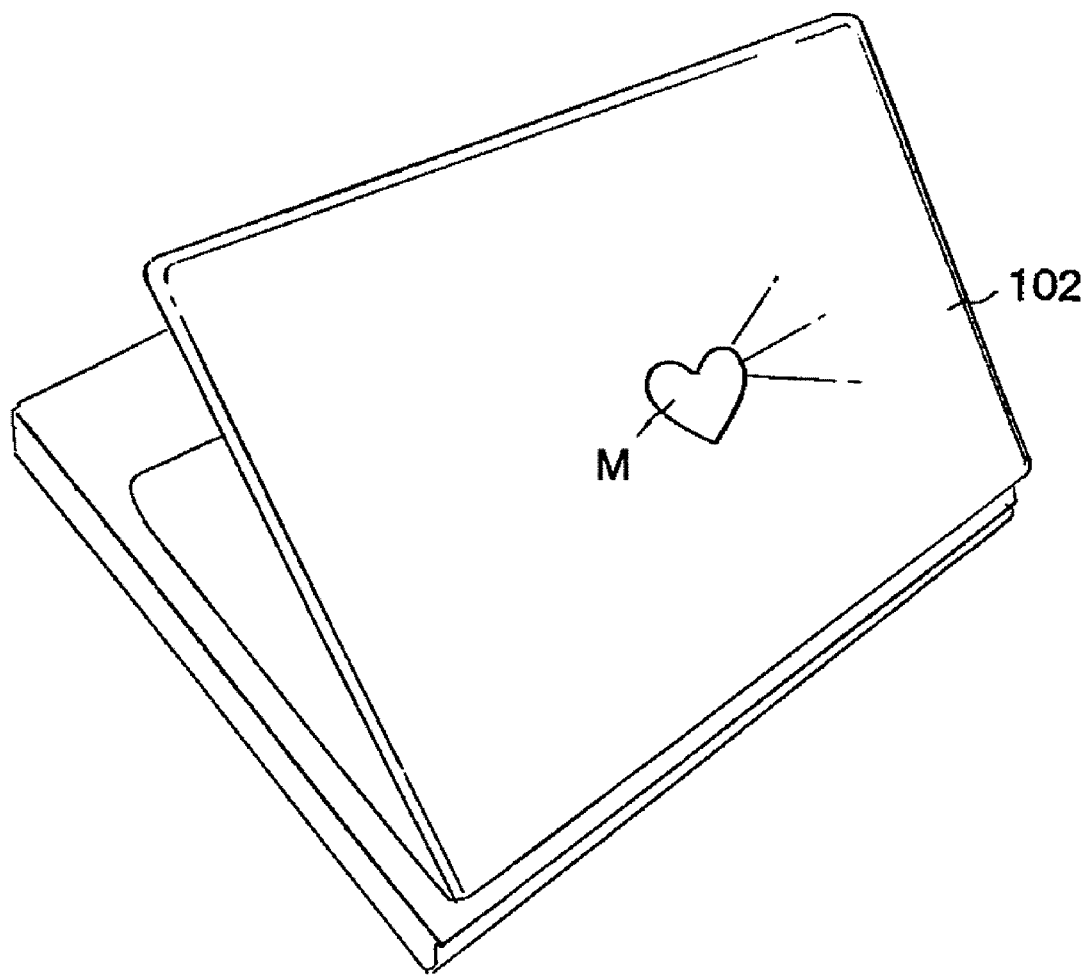
FIG. 12 is a perspective view depicting an exemplary illumination of a personal computer cover using the conventional surface light source device shown in FIG. 11.

When the reflecting sheet 106 shown in FIG. 11 is replaced by each of the reflecting sheets 6 and the transparent sheets 9 shown in FIGS. 1a-1b to 3a-3b, a part of light emitted from the LED light source 104 can enter into the above-described light incoming surface of the transparent sheet 9. The light that enters into the transparent sheet 9 via the light incoming surface can be emitted from the second surface of the transparent sheet 9, which may become the rear surface of the surface light source device 101.

In this case, the surface light source device of the disclosed subject matter can maintain high light use efficiency because the silver sheet with high reflectivity can be used as the reflecting sheet 9. In addition, a logo and the like that is located on the rear surface of the surface light source device can be illuminated by light that can enter into the transparent sheet 9 in an effective manner.

As described above, the whole rear surface or a part of the rear surface can be illuminated by light that can enter into the transparent sheet 9 via the light incoming surface. However, ink printing, dot pattern and prism face can be formed as a light-emitting treatment on the whole surface of the first or the second surface of the transparent sheet 9 or a part of the first and/or the second surface. The exemplary embodiments will now be described further with reference to FIGS. 4a-4b to 6a-6b.

The positional relationship between the reflecting sheet 6 and the transparent sheet 9 shown in FIGS. 4 to 6 is the same as that shown in FIG. 1. The transparent sheet 9 can face the reflecting sheet 6, but a part of the transparent sheet 9 can be exposed so as to eliminate overlap with the reflecting sheet 6. The exposed part of the transparent sheet 9 can be located toward the light source.

Figure 4A:
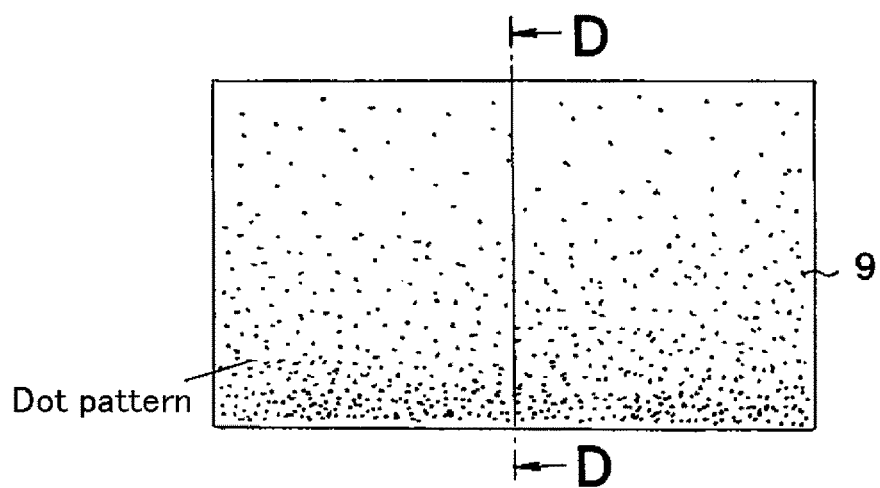
FIG. 4a is a schematic rear view showing a first exemplary transparent sheet and the reflecting sheet illustrating an illumination on a rear surface of a surface light source device.
Figure 4B:
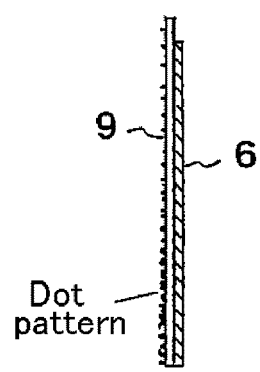
FIG. 4b is a cross-sectional view of the disclosed subject matter of FIG. 4a taken along line D-D.

FIG. 4a is a schematic rear view showing a first exemplary transparent sheet for describing illumination on a rear surface of a surface light source device, and FIG. 4b is a cross-sectional view of FIG. 4a along a line D-D. When the whole transparent sheet 9 is illuminated, the structure shown in FIGS. 4a and 4b is useful. Dot patterns can be formed as the uniform light-emitting treatment on the whole second surface of the transparent sheet 9 using a mechanical treatment such as a press process and so on.

In this case, the density of dot patterns can become higher gradually as the dot patterns become farther from the light source. The whole transparent sheet 9 can be uniformly illuminated because light emitted from the transparent sheet 9 can evenly diffuse on the second surface of the transparent sheet 9. When a prism face is also formed as the uniform light-emitting treatment on the whole second surface of the transparent sheet 9, the same effect can be available if the density becomes higher gradually as the prism face becomes farther from the light source.

When ink printing is utilized to form the uniform light-emitting treatment on the transparent sheet 9, white ink printing can be carried out using a white ink that is made by mixing a pigment such as barium sulfate, barium carbonate, titanium oxide and the like with a transparent resin. The white ink printing can also be printed by a dispersing ink, which is made by mixing silica and the like with a transparent resin. The above-described lighting color can be changed by printing an ink other than the white ink, for example, a red ink, green ink, etc.

Figure 5A:
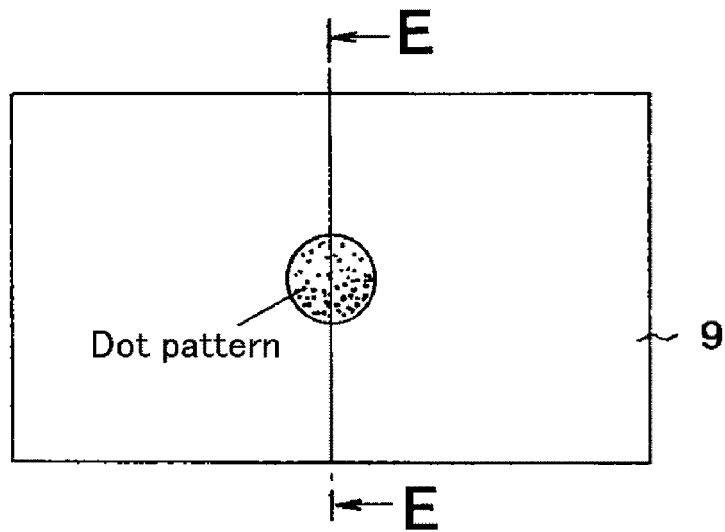
FIG. 5a is a schematic rear view showing a second exemplary transparent sheet and the reflecting sheet for illustrating an illumination on a rear surface of a surface light source device.
Figure 5B:
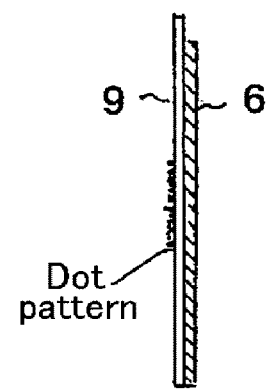
FIG. 5b is a cross-sectional view of the subject matter of FIG. 5a taken along line E-E.

FIG. 5a is a schematic rear view showing a second exemplary transparent sheet for describing illumination on a rear surface of a surface light source device, and FIG. 5b is a cross-sectional view of FIG. 5a along a line E-E. In this case, a dot pattern can be formed as the light-emitting treatment on a circle in the middle of the second surface of the transparent sheet 9, and a mirror finish can be formed on the area other than the circle. As a result, the only circle can be partially illuminated.

In this case, the density of dot patterns can become higher gradually as the dot patterns become farther from the light source in order to be evenly emitted. However, when the size is small, the uniform light-emitting treatment may be eliminated because light can easily enter into the illuminating area. In the above-described exemplary embodiments, the light-emitting treatment can be formed on the second surface of the transparent sheet 9. The light-emitting treatment can also be formed on the first surface of the transparent sheet 9, which faces the reflecting sheet 6.

Figure 6A:
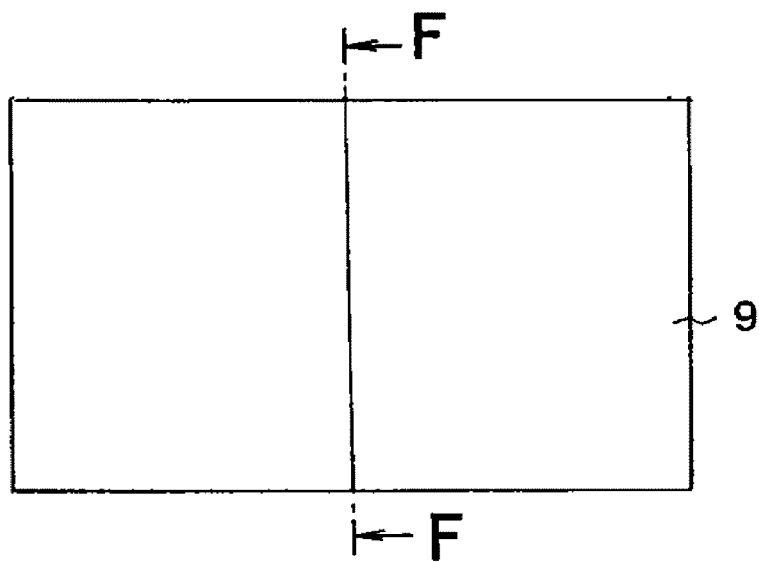
FIG. 6a is a schematic rear view showing a third exemplary transparent sheet and the reflecting sheet for illustrating an illumination on a rear surface of a surface light source device.
Figure 6B:
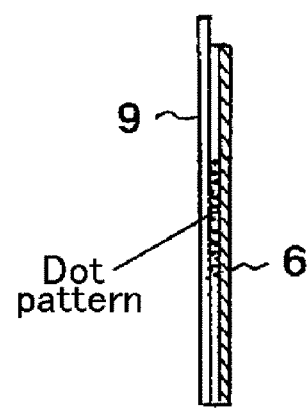
FIG. 6b is a cross-sectional view of the disclosed subject matter of FIG. 6a taken along line F-F.

FIG. 6a is a schematic rear view showing a third exemplary transparent sheet for describing illumination on a rear surface of a surface light source device, and FIG. 6b is a cross-sectional view of FIG. 6a along a line F-F. The above-described light-emitting treatments can be formed on the first surface of the transparent sheet 9, and the transparent sheet 9 can be attached to the reflecting sheet 6 via an adhesive material, a transparent adhesive material and the like so as not to generate bubbles therein. If bubbles are generated in the adhesive material, a part of the bubbles may shine and may cause problems with light control. The above-described exemplary embodiments are described using the location between the reflecting sheet 6 and the transparent sheet 9 shown in FIG. 1. However, a similar effect can also be accomplished by using the other locations shown in FIGS. 2a-2b and 3a-3b.

Exemplary surface light source devices of the disclosed subject matter will now be described in detail with reference to FIG. 7 to FIG. 10.

A First Embodiment

Figure 7:
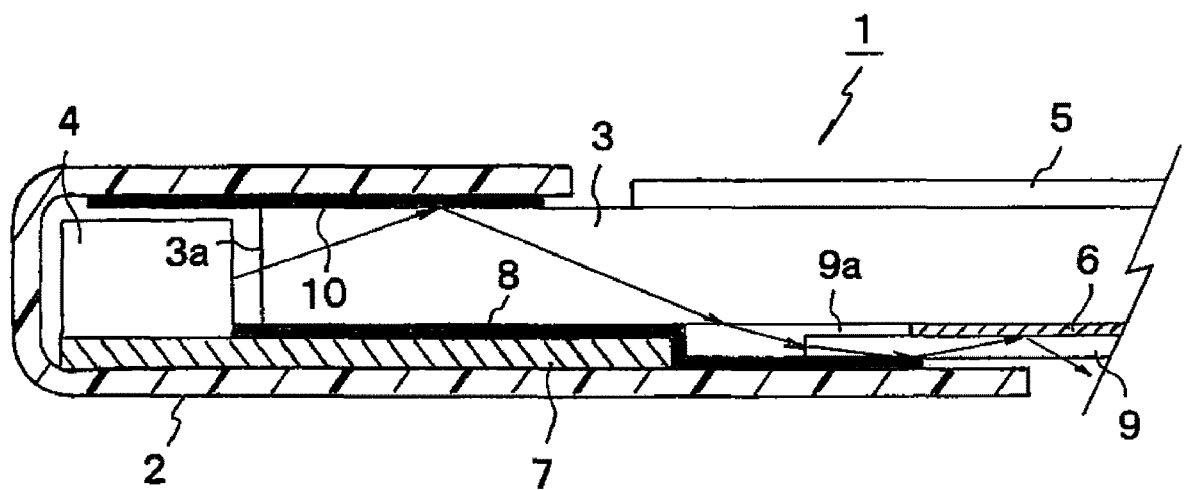
FIG. 7 is a partial cross-sectional view showing a first exemplary embodiment of a surface light source device made in accordance with principles of the disclosed subject matter.

FIG. 7 is a partial cross-sectional view showing a first exemplary embodiment of a surface light source device 1 made in accordance with principles of the disclosed subject matter. The surface light source device 1 can include a light guide 3 having a first surface and a second surface and a third surface 3a, an optical sheet 5 having a first surface and a second surface that is located adjacent to an/or on the first surface of the light guide 3, a reflecting sheet 6 having a second surface and a first surface that is located adjacent to and/or on the second surface of the light guide 3, a transparent sheet 9 having alight incoming surface and a second surface and a first surface that is located adjacent to and/or on the second surface of the reflecting sheet 6, a light incoming surface (9a) thereof being included adjacent to and/or on the second surface, an LED light source 4 that is used as the light source located adjacent the third surface 3a of the light guide 3 and a casing 2.

The light guide 3 can be composed of a transparent thermoplastic resin such as an acrylic resin and the like, and can be formed as a flat rectangular plate for an LCD. The third surface 3a can be substantially perpendicular to the first and the second surface, which are substantially parallel with respect to each other. The third surface 3a of the light guide 3 can be used as a light incoming surface for the light guide 3 with high efficiency. The second surfaces of the light guide 3 can include a plurality of dot patterns thereon in order to provide uniform light-emission from the first surface.

The optical sheet 5 can be a light collecting sheet, a diffusing reflection sheet and so on. The light collecting sheet can be configured with or made from a transparent material and can be configured to define a light distribution of the surface light source device 1. For example, a prismatic sheet can be used as the light collecting sheet. The diffusing reflection sheet can be configured as an optical resin film and can also be configured to reflect incoming light while also diffusing the incoming light thereon. For example, the diffusing reflection sheet can have a large number of diffusive micro-cavitations and/or a diffusive material such as a titanium oxide and the like included therein.

The second surface of the optical sheet 5 can be located adjacent the first surface of the light guide 3 so that the first surface of the light guide 3 can face the second surface of the optical sheet 5. In this case, the number of optical sheets 5, its characteristics and the like can be selected according to optical transmission displays such as LCDs and the like, and their usage as described later.

Figure 13:
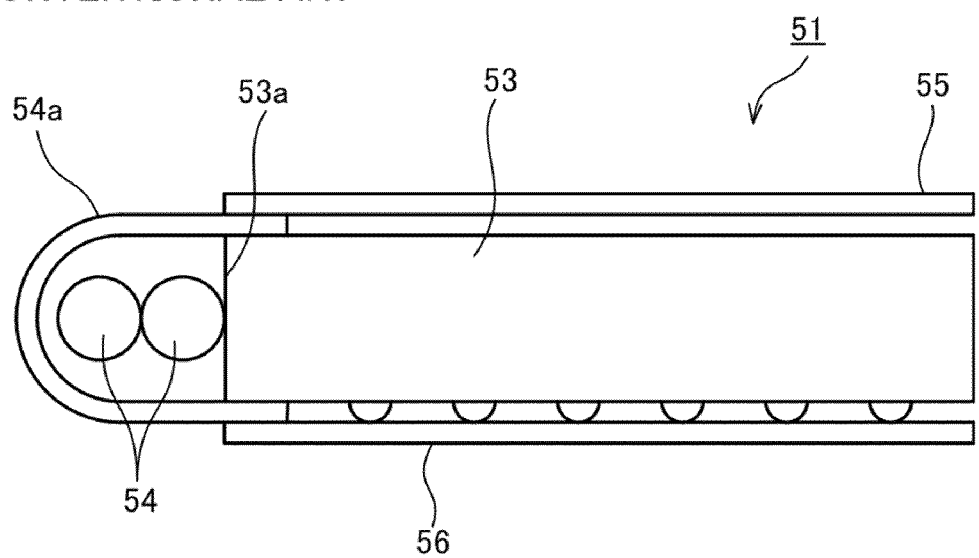
FIG. 13 is a cross-sectional view depicting a basic structure for a conventional surface light source device in which discharge lamps are used as a light source.

The LED light source 4 can include a plurality of LEDs, which are mounted on a flexible printed circuit board 7 via solders so as to align along the third surface 3a of the light guide 3. In this case, side-view type LEDs can be used as the LED light source 4, and can be located so that light emitted from the LEDs can enter into the third surface 3a of the light guide 3 substantially at a right angle. When side-view type LEDs are used as the LED light source 4, the reflector shown in FIG. 13 may not be required and the light emitted from the LEDs can enter into the light guide 3 via the third surface 3a under an optimal condition.

The flexible printed circuit board 7 that mounts the LED light source 4 thereon can be attached to the casing 2 via a white adhesive tape 8 for a flexible circuit board. When the surface light source device 1 needs to illuminate a wider area and needs to illuminate with a brighter light, the LED light source 4 can also be located on an opposite side of the third surface 3a of the light guide 3 in order to increase the light entering into the light guide 3.

In the first exemplary embodiment of the disclosed subject matter, the first surface of the transparent sheet 9 can be located adjacent to and/or on the second surface of the reflecting sheet 9. The transparent sheet 9 can project from the reflecting sheet 6, and the projecting width of the projecting portion 9a can be around 0.2 to 10 mil meters away from the end of the reflecting sheet 6. The projecting portion 9a can be located toward the LED light source 4 as the light incoming surface for the transparent sheet 9. When the transparent sheet 9 is incorporated in the surface light source device 1, the projecting portion 9a can be mounted on the adhesive sheet 8 and can be attached to the casing 2.

The reflecting sheet 6 can be attached to the casing 2 along with the transparent sheet 9 via the adhesive sheet 8 so that the first surface of the reflecting sheet 6 can be located adjacent to and/or on the second surface of the light guide 3. The light guide 3 can also be attached to the casing 2 via an adhesive tape 10 for the first surface of the light guide 3. Therefore, the light guide 3, reflecting sheet 6 and the transparent sheet 9 can attached to the casing 2 while both the third surface 3a of the light guide 3 and the projecting portion 9a are located toward the LED light source 4.

When the LED light source 4 is turned on in the surface light source device 1, light emitted from the LED light source 4 can enter into the light guide 3 via the third surface 3a that can be used as a light incoming surface for the light guide 3, and the light can be mainly reflected on the first surface of the reflecting sheet 6. The light can be diffused by the light guide 3 and the reflecting sheet 6, and can be emitted from the first surface of the light guide 3 as uniform light-emission via the optical sheet 5.

In this case, a part of the light emitted from the LED light source 4 can enter into the projecting portion 9a of the transparent sheet 9 as shown in FIG. 7, and can be guided in the transparent sheet 9. The light can be reflected by the reflecting sheet 6 and the transparent sheet 9, and finally can be emitted from the second surface of the transparent surface 9 as the rear lighting-emission for the rear illumination. The rear lighting-emission can be used for a second optical transmission display, and the optical sheet 5 can also be located between the second optical transmission display and the second surface of the transparent sheet 9 for the same purpose as that as the light emitted from the first surface of the light guide 3 according to the usage of the second optical transmission display.

In the surface light source device 1 of the disclosed subject matter, when the reflecting sheet 6 includes a silver layer with high reflectivity, the surface light source device 1 can demonstrate higher light use efficiency. In addition, the light that enters into the transparent sheet 9 via the projecting portion 9a can also be reflected on the reflecting sheet 6 with high reflectivity, and therefore the rear lighting-emission can be used for the second optical transmission display with higher brightness.

A Second Exemplary Embodiment

Figure 8:
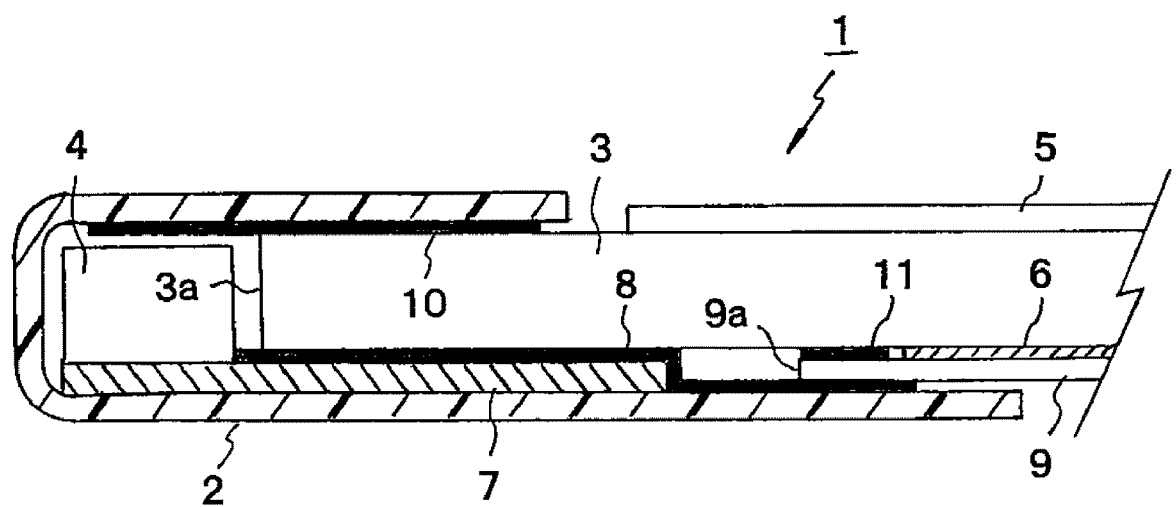
FIG. 8 is a partial cross-sectional view showing a second exemplary embodiment of the surface light source device made in accordance with principles of the disclosed subject matter.

The second exemplary embodiment will now be described with reference to FIG. 8. FIG. 8 is a partial cross-section view showing a second exemplary embodiment of a surface light source device made in accordance with principles of the disclosed subject matter. The same or similar elements to those in FIG. 7 are listed as the same reference numerals in FIG. 8, and their descriptions are abbreviated.

A difference between the first exemplary embodiment and the second exemplary embodiment includes a transparent smooth tape 11 in the second exemplary embodiment. The transparent smooth tape 11 (e.g. WP-1116 made by Cosumotech Co. Ltd.) can include adhesive materials on both sides thereof, and can be located between the second surface of the light guide 3 and the projecting portion 9a on the first surface of the transparent sheet 9.

The projecting portion 9a of the transparent sheet 9 can be attached to the light guide 3 via the transparent smooth tape 11. Thus, because the amount of light that enters into the transparent sheet 9 via the projecting portion 9a can increase due to the transparent smooth tape 11, the effectiveness of the rear lighting-emission can be enhanced with higher efficiency.

A Third Exemplary Embodiment

Figure 9:
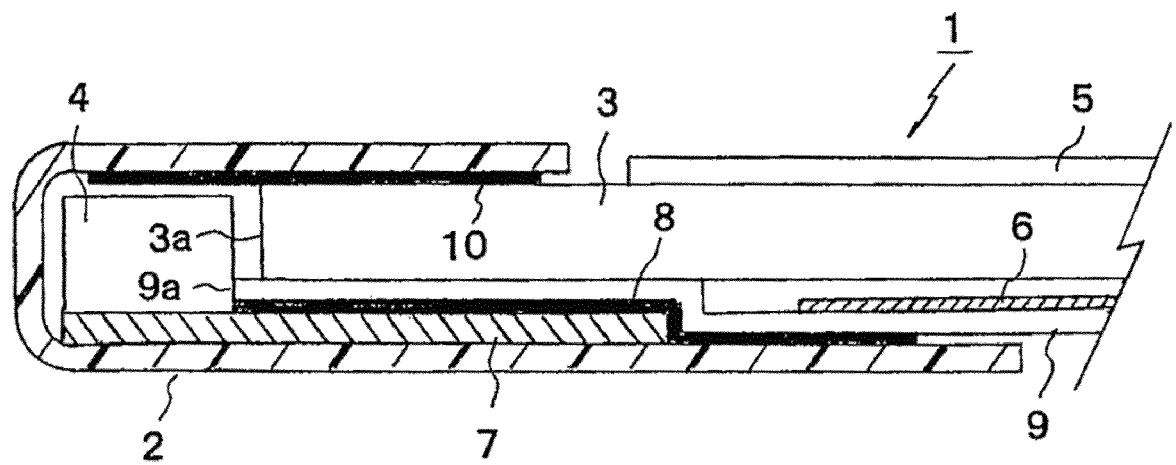
FIG. 9 is a partial cross-sectional view showing a third exemplary embodiment of the surface light source device made in accordance with principles of the disclosed subject matter.

The third exemplary embodiment will now be described with reference to FIG. 9. FIG. 9 is a partial cross-sectional view showing a third exemplary embodiment of a surface light source device made in accordance with principles of the disclosed subject matter. The same or similar elements to those in FIG. 7 are listed as the same reference numerals in FIG. 9, and their descriptions are abbreviated.

A difference between the first exemplary embodiment and the third exemplary embodiment is a location of the projecting portion 9a of the transparent sheet 9. An end surface of the projecting portion 9a can be in contact with the LED light source 4 in the third exemplary embodiment. Therefore, the light that enters into the transparent sheet 9 can be entered directly from the LED light source 4 via the end surface of the projecting portion 9a, which is connected to the LED light source 4.

In this case, the surface light source device 1 cannot only increase the amount of the light that enters into the transparent sheet 9, but also can select the location where the light enters into the transparent sheet 9 via the projecting portion 9a. Thus, because the light that enters into the transparent sheet 9 can be selectively used for the rear light-emission, the rear light-emission emitted from the transparent sheet 9 can be used for the second optical transmission display with higher efficiency and more effect.

A Fourth Exemplary Embodiment

Figure 10:
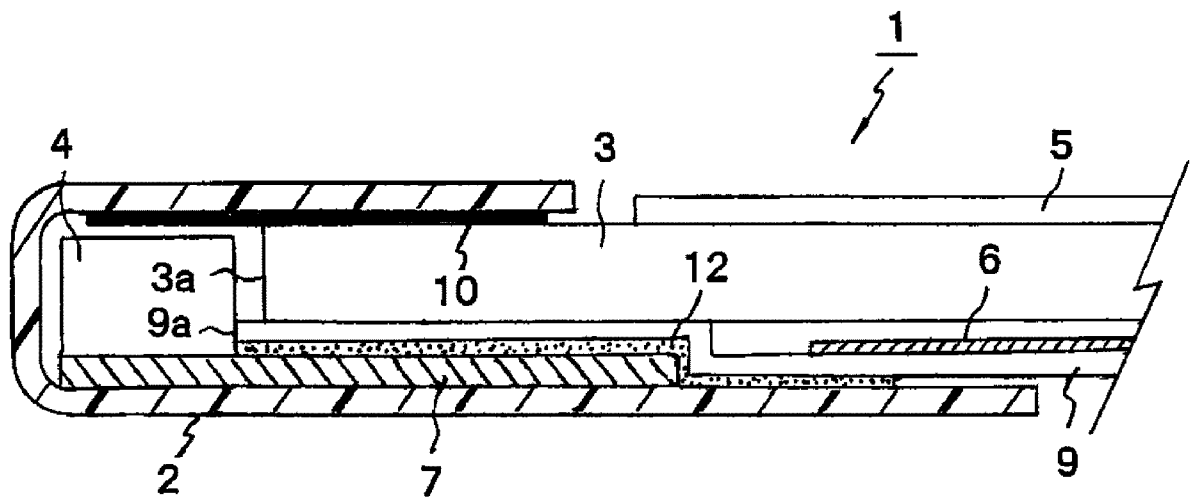
FIG. 10 is a partial cross-sectional view showing a fourth exemplary embodiment of the surface light source device made in accordance with principles of the disclosed subject matter.

The fourth exemplary embodiment will now be described with reference to FIG. 10. FIG. 10 is a partial cross-sectional view showing a fourth exemplary embodiment of a surface light source device made in accordance with principles of the disclosed subject matter. The same or similar elements to those in FIG. 9 are listed as the same reference numerals in FIG. 10, and their descriptions are abbreviated.

A difference between the third exemplary embodiment and the fourth exemplary embodiment is replacement of the white adhesive tape 8 for the flexible circuit board 7 with a white-printed adhesive tape 12, in which a side located on the transparent sheet 9 is white-printed. Therefore, the transparent sheet 9 including the projecting portion 9a, the reflecting sheet 6 and the flexible printed board 7 that mounts the LED light source 4 thereon can be attached to the casing 2 along with the light guide 3.

In addition, the light use efficiency on the projecting portion 9a can improve by the white-printed tape 12, and the rear light-emission can be used for the second optical transmission display with high efficiency and more effect. Furthermore, the above-described parts for the surface light source device 1 can be incorporated in the casing 2 with a simple structure, and the simple structure can result in cost reduction.

In the above-described exemplary embodiments, the light incoming surface of the transparent sheet 9 is described using the projecting portion 9a shown in FIGS. 1a and 1b. However, the exposed portions on the first surface of the transparent sheet 9 shown in FIGS. 2a-2b and 3a-3b can be used as the light incoming surface, and also the light incoming surface can be formed in various other shapes and configurations without limitation according to the usage and the like of the surface light source device 1. In addition, the exemplary embodiments are described using the LED light source 4 as the light source. However, the light source cannot be limited to the LED light source 4, and other light sources such as a cold cathode fluorescent lamp and the like can be used as the light source.

An LCD unit using the surface light source device 1 will now be described. The LCD unit can be assembled by mounting an LCD on the first surface of the optical sheet 5, which is located adjacent the light guide 3. In this case, the light collecting sheet, a diffusing reflection sheet and the like can be used as the optical sheet 5. The light collecting sheet can be configured to define the light distribution of the surface light source device 1, and the diffusing reflection sheet can be configured to diffuse the light of the surface light source device 1.

Thus, the diffusing reflection sheet can be located adjacent the light guide 3 for diffusing the light that is emitted from the light guide 3, and the light collecting sheet can be located on the diffusing reflection sheet for defining the light distribution, and finally the LCD can be located on the light collecting sheet. In this case, either one of the above sheets can be eliminated according to the usage and the like of the LCD.

On the other hand, a second optical transmission display such as the logo and the like can be located adjacent the second surface of the transparent sheet 9. Because a second LCD can also be located adjacent the transparent sheet 9 via the optical sheet 5, the surface light source device 1 can provide an LCD unit that can be seen from the both sides. When using one LCD, the rear light-emission can also be used for illuminating a cable extending backwards, for confirming on/off of power supply, etc.

The surface light source device 1 of the exemplary embodiments can be configured for use as a light source of a back light unit in an LCD unit for use in a personal computer, display devices, etc. In these cases, the LCD unit can be configured to locate the surface light source device 1 in the rear of a LCD panel.

However, these surface light source devices can also be configured for use as other light sources, such as for flat lighting and the like, without departing from the spirit and scope of the presently disclosed subject matter.

While there has been described what are at present considered to be exemplary embodiments of the invention, it will be understood that various modifications may be made thereto, and it is intended that the appended claims cover such modifications as fall within the true spirit and scope of the invention. All conventional art references described above are herein incorporated in their entirety by reference.

What is claimed is:

1. A surface light source device, comprising:
    a light guide having a first surface and a second surface and at least one third surface, the light guide including a transparent resin and formed as a flat plate, the at least one third surface being substantially perpendicular to both the first surface and the second surface which are substantially parallel with respect to each other;
    a light source located adjacent the at least one third surface of the light guide;
    a reflecting sheet having a first surface and a second surface and an end, the first surface of the reflecting sheet located adjacent the second surface of the light guide; and
    a transparent sheet having a first surface and a second surface and a light incoming surface, the transparent sheet including a transparent resin, the first surface of the transparent sheet including the light incoming surface on the first surface and located adjacent the second surface of the reflecting sheet, the light incoming surface having an end surface located adjacent the end of the reflecting sheet, the light incoming surface facing the second surface of the light guide without interruption by the reflecting sheet such that light can pass from the second surface of the light guide to the light incoming surface of the transparent sheet, and the end surface of the light incoming surface being located toward the light source.

2. The surface light source device according to claim 1, further comprising:
    a transparent smooth tape located between the second surface of the light guide and the light incoming surface of the transparent sheet.

3. The surface light source device according to claim 1, wherein the end surface of the transparent sheet contacts the light source.

4. The surface light source device according to claim 1, wherein the reflecting sheet includes a silver layer on at least the first surface of the reflecting sheet.

5. The surface light source device according to claim 2, wherein the reflecting sheet includes a silver layer on at least the first surface of the reflecting sheet.

6. The surface light source device according to claim 3, wherein the reflecting sheet includes a silver layer on at least the first surface of the reflecting sheet.

7. The surface light source device according to claim 1, wherein a light-emitting treatment is located on at least one of the first surface and the second surface of the transparent sheet.

8. The surface light source device according to claim 2, wherein a light-emitting treatment is located on at least one of the first surface and the second surface of the transparent sheet.

9. The surface light source device according to claim 3, wherein a light-emitting treatment is located on at least one of the first surface and the second surface of the transparent sheet.

10. The surface light source device according to claim 4, wherein a light-emitting treatment is located on at least one of the first surface and the second surface of the transparent sheet.

11. The surface light source device according to claim 5, wherein a light-emitting treatment is located on at least one of the first surface and the second surface of the transparent sheet.

12. The surface light source device according to claim 6, wherein a light-emitting treatment is located on at least one of the first surface and the second surface of the transparent sheet.

13. A surface light source device, comprising:
    a light guide having a first surface and a second surface and at least one third surface, the light guide including a transparent resin and formed as a flat rectangular plate, the at least one third surface being substantially perpendicular to both the first surface and the second surface which are substantially parallel with respect to each other;
    a plurality of LEDs mounted on a circuit board and located adjacent the at least one third surface of the light guide so as to align along the at least one third surface;
    a reflecting sheet having a first surface and a second surface and an end, and formed in a rectangular shape, the first surface of the reflecting sheet being located adjacent the second surface of the light guide;
    a transparent sheet having a first surface and a second surface and a light incoming surface, the transparent sheet including a transparent resin, and formed in a rectangular shape, the first surface of the transparent sheet including the light incoming surface on the first surface and located adjacent the second surface of the reflecting sheet, the light incoming surface having an end surface located adjacent to the end of the reflecting sheet, the light incoming surface facing the second surface of the light guide and configured such that light transmitted between the light incoming surface and second surface of the light guide is not interrupted by the reflecting sheet, and the end surface of the light incoming surface is located toward the light source;

a casing located adjacent the plurality of LEDs and the circuit board, the casing covering at least the third surface of the light guide and the LEDs and at least a part of the second surface of the transparent sheet that is positioned opposite the light incoming surface on the first surface of the transparent sheet; and a white adhesive tape located between the casing and at least the part of the second surface of the transparent sheet that is positioned opposite the light incoming surface on the first surface of the transparent sheet, wherein the circuit board, the light guide, the reflecting sheet and the transparent sheet are attached to the casing with the white adhesive tape.

14. The surface light source device according to claim 13, wherein the reflecting sheet includes a silver layer on at least the first surface thereof.

15. The surface light source device according to claim 13, wherein a light-emitting treatment is located on at least one of the first surface and the second surface of the transparent sheet.

16. The surface light source device according to claim 14, wherein a light-emitting treatment is located on at least one of the first surface and the second surface of the transparent sheet.

17. A liquid crystal display unit including the surface light source device according to claim 1, comprising:

at least one optical sheet having a first surface and a second surface, the second surface of the optical sheet located adjacent the first surface of the light guide;

a liquid crystal display located on the first surface of the at least one optical sheet; and a second optical transmission display located adjacent the second surface of the transparent sheet.

18. A liquid crystal display unit including the surface light source device according to claim 10, comprising:

at least one optical sheet having a first surface and a second surface, the second surface of the optical sheet located adjacent the first surface of the light guide;

a liquid crystal display located on the first surface of the at least one optical sheet; and a second optical transmission display located adjacent the second surface of the transparent sheet.

19. A liquid crystal display unit including the surface light source device according to claim 13, comprising:

at least one optical sheet having a first surface and a second surface, the second surface of the optical sheet located adjacent the first surface of the light guide;

a liquid crystal display located on the first surface of the at least one optical sheet; and a second optical transmission display located adjacent the second surface of the transparent sheet.

20. A liquid crystal display unit including the surface light source device according to claim 16, comprising:

at least one optical sheet having a first surface and a second surface, the second surface of the optical sheet located adjacent the first surface of the light guide;

a liquid crystal display located on the first surface of the at least one optical sheet; and a second optical transmission display located adjacent the second surface of the transparent sheet.

* * * * *